United States Patent
Caniaz et al.

(10) Patent No.: US 10,570,285 B2
(45) Date of Patent: Feb. 25, 2020

(54) PETROCOKE AND EXTRACT-DOPED MODIFIED BITUMEN COMPOSITION FOR USE IN PRODUCTION OF ASPHALT AND METHOD OF PRODUCING THE SAME

(71) Applicant: TURKIYE PETROL RAFINERILERI A.S. TUPRAS, Korfez, Kocaeli (TR)

(72) Inventors: Ramazan Oguz Caniaz, Kocaeli (TR); Refika Cetintas, Kocaeli (TR); Emel Baskent, Kocaeli (TR); Serhat Arca, Kocaeli (TR); Muzaffer Yasar, Istanbul (TR)

(73) Assignee: TURKIYE PETROL RAFINERILERI A.S. TUPRAS, Korfez, Kocaeli (TR)

( * ) Notice: Subject to any disclaimer, the term of this patent is extended or adjusted under 35 U.S.C. 154(b) by 238 days.

(21) Appl. No.: 15/525,891

(22) PCT Filed: Sep. 9, 2015

(86) PCT No.: PCT/TR2015/000312
§ 371 (c)(1),
(2) Date: May 10, 2017

(87) PCT Pub. No.: WO2016/076804
PCT Pub. Date: May 19, 2016

(65) Prior Publication Data
US 2017/0327689 A1   Nov. 16, 2017

(30) Foreign Application Priority Data

Nov. 13, 2014 (TR) .................. 2014 13421

(51) Int. Cl.
| | |
|---|---|
| *C08L 95/00* | (2006.01) |
| *C08K 3/013* | (2018.01) |
| *C10C 3/00* | (2006.01) |
| *B01F 3/12* | (2006.01) |
| *C10B 55/00* | (2006.01) |
| *C08K 3/04* | (2006.01) |
| *C08L 91/00* | (2006.01) |

(52) U.S. Cl.
CPC ............... *C08L 95/00* (2013.01); *B01F 3/12* (2013.01); *C08K 3/013* (2018.01); *C08K 3/04* (2013.01); *C08L 91/00* (2013.01); *C10B 55/00* (2013.01); *C10C 3/00* (2013.01); *B01F 2215/0063* (2013.01); *C08K 2201/005* (2013.01); *C08L 2555/22* (2013.01); *C08L 2555/40* (2013.01); *C08L 2555/50* (2013.01); *C08L 2555/60* (2013.01); *C08L 2555/74* (2013.01)

(58) Field of Classification Search
CPC .. C08L 95/00; C08L 2555/22; C08L 2555/40; C08L 2555/50; C08L 2555/60; C08L 2555/74; C09D 195/00; C04B 26/26; B01F 3/12; B01F 2215/0063; C10C 3/00; C10B 55/00; C08K 2201/005; C10G 9/00; C10G 9/005; C10G 11/00; C10G 21/00; C10G 51/00; C10G 55/00; C01B 32/00; C01B 32/30; C01B 32/33
See application file for complete search history.

(56) References Cited

U.S. PATENT DOCUMENTS

| | | | |
|---|---|---|---|
| 3,801,341 A | 4/1974 | Draper et al. | |
| 3,802,898 A | 4/1974 | Laurent et al. | |
| 5,449,401 A | 9/1995 | Zuberer | |
| 5,807,478 A | 9/1998 | Myers et al. | |
| 6,440,205 B1 * | 8/2002 | Bailey .................... | C08L 95/00 106/275 |
| 8,062,413 B1 | 11/2011 | Al-Mehthel et al. | |
| 2008/0271639 A1 * | 11/2008 | Partanen ................ | C08L 95/00 106/273.1 |

(Continued)

FOREIGN PATENT DOCUMENTS

| | | |
|---|---|---|
| CN | 103305014 A | 9/2013 |
| EP | 0240090 A2 | 10/1987 |

(Continued)

OTHER PUBLICATIONS

ASTM D88 "Standard Test Method for Saybolt Viscosity" Reapproved 2019 (Year: 2019).*

(Continued)

*Primary Examiner* — Alexandra M Moore
(74) *Attorney, Agent, or Firm* — Notaro, Michalos & Zaccaria P.C.

(57) ABSTRACT

A modified bitumen composition used in asphalt-coated roads as a binding raw material having petrocoke, a derivative of carbon based crude oil, and extract, a base oil unit by-product, as additives, and to a method of producing the same. The modified bitumen composition of the invention contains at least 55% by weight of bitumen with a penetration in the range of 40 to 110 as per EN 1426 standard, and 1%-40% by weight of petrocoke with a particle size preferably less than 300 micrometers, and 2% to 5% by weight of extract, a base oil unit by-product, as additives. Determination of the amount of the additives petrocoke and extract to be added to the bitumen, optimum values of such parameters as mixing temperature and mixing rate to distribute in the bitumen homogenously and the conditions at which the modified bitumen may be stored and/or transported without losing its improved properties.

5 Claims, No Drawings

(56) References Cited

U.S. PATENT DOCUMENTS

2009/0084287 A1\* 4/2009 Partanen ................ C08L 95/00
106/273.1
2014/0014000 A1\* 1/2014 Franzen ................ C08L 95/00
106/273.1

FOREIGN PATENT DOCUMENTS

GB 996274 A 6/1965
RU 2141494 C1 11/1999
WO 2009042675 A1 4/2009

OTHER PUBLICATIONS

International Search Report and Written Opinion for corresponding PCT Application No. PCT/TR2015/000312, dated Dec. 15, 2015.
International Preliminary Examination Report for corresponding PCT Application No. PCT/TR2015/000312, dated Feb. 28, 2017.
Manoj Srivastava: "Lubricating Base Oil Production—Technology Overview", Jun. 11, 2013 (Jun. 11, 2013), pp. 1-61, XP055233194, Retrieved from the Internet: URL:http://www.petrotechsociety.org/Presentations/ 8th_Summer_School/ Session 8 Dr. Manoj Srivastava.pdf.
Krzysztof Blazejewski et al: "2014 Bitumen Handbook", Jan. 1, 2014 (Jan. 1, 2014), pp. 1-137. XP055306446, Plock, Poland Retrieved from the Internet: URL: http://www.orlen-asf alt.pl/pl/info rmacjetech niczn e/po rtalwi edzy/ documents/poradnik_eng_ostateczny.pdf.

\* cited by examiner

PETROCOKE AND EXTRACT-DOPED MODIFIED BITUMEN COMPOSITION FOR USE IN PRODUCTION OF ASPHALT AND METHOD OF PRODUCING THE SAME

FIELD OF THE INVENTION

The present invention relates to a modified bitumen composition used in asphalt-coated roads as a binding raw material and comprising petrocoke, a derivative of carbon based crude oil, and extract, a base oil unit by-product, as additives, and to a method of producing the same.

BACKGROUND ART

In petroleum refineries, bitumen generated as a bottom/residue product in distillation columns after treatment of the crude oil is widely used in asphalt-coated roads as a binding raw material as well as its areas of usage such as waterproofing.

In asphalt-coated roads achieved with the use of bitumen which is a refinery product, thermal cracks, cracks resulting from fatigue and rutting problems are experienced over time, depending on the area of use and climate conditions. Depending on the growing vehicle density, such impairments also tend to increase. However, with the bitumen compositions used in the prior art, in areas where high vehicle density is seen or extremely hot/cold climate conditions prevail, said problems experienced in highways may not be solved.

In addition to the said problems, it is necessary to store carbon based crude oil derivatives and process by-products/residues in petroleum refineries so as to render them harmless to the environment or to develop methods for economic use thereof.

Based on the prior art, various additives are used and modified bitumen compositions are developed, in order to increase the resistance and performance of the bitumen compositions to avoid said problems. In the modified bitumen compositions according to the present invention, resistance of the binding bitumen and thus asphalt coatings is increased by addition of viscosity reducing fillers such as sulphure and ash, and mainly polymer, and different additives that induce cross-linking.

The state-of-art document U.S. Pat. No. 5,807,478A discloses bitumen modification using ash derived from bitumen petrocoke. In the said method, vanadium and nickel containing ash is added to the bitumen to lower the viscosity and specific gravity of the bitumen whereby it is rendered pipelineable. Here, the ash is added to the bitumen in an amount of about 5 to 25 wt. %. Therefore, the technical problem to be solved by U.S. Pat. No. 5,807,478A is to change the viscosity and specific gravity of the bitumen so as to render it pipelineable, wherein no mention is made to increase the resistance of bitumen.

In the state-of-art document U.S. Pat. No. 5,449,401A, it is disclosed that with the addition of fly ash in combination with the aggregate into hot-mix asphalt, the resistance of the asphalt to cracks and potholes is enhanced. In the said fly ash, calcium, magnesium, arsenic, boron, cadmium, chromium, cobalt, copper, iron, lead, manganese, molybdenum, nickel, vanadium, zinc, selenium, strontium, aluminum and zirconium are present. Added fly ash improves mechanical properties of asphalt such as tensile force, flexibility etc. and reduces costs with respect to the amount of use. However, since some materials in the fly ash are toxic, the production method of the modified bitumen disclosed in U.S. Pat. No. 5,449,401A becomes unsafe especially for the workers.

U.S. Pat. No. 8,062,413 B1 uses aggregate and high carbon content fly ash in order to increase the performance of an asphalt mixture. It is known that fly ash in the amount of 3% to 10% along with bitumen and aggregate increases the resistance and stability against crack formation in asphalt. However, use of fly ash resulting from combustion of fuels in U.S. Pat. No. 5,449,401A and U.S. Pat. No. 8,062,413B1 causes air pollution and emissions of pollutant combustion. Furthermore, fly ash used in similar patent documents as U.S. Pat. No. 5,449,401 A and U.S. Pat. No. 8,062,413 B1 is utilized in combination with aggregate in asphalt mixture, not a bitumen additive.

In the literature, some of the modifications to improve properties of the asphalt coatings may be performed on asphalt composition, and others may be performed on bitumen compositions. In accordance with EN 13108-4 standard, the amount of bitumen used in asphalt composition is 4% to 11%. Although the amount of bitumen used in asphalt appears to be low according to the standard, it is one of the most important factors that directly and dominantly affect the properties of asphalt.

Finally, in the state-of-art, there is no product or method that increases performance grading of bitumen by using petrocoke, a by-product of a refinery process, and extract, a base oil unit by-product, and allows obtaining modified bitumen and high quality asphalt.

BRIEF DESCRIPTION OF THE INVENTION

The composition of modified bitumen according to the present invention contains continuous phase bitumen with a penetration in the range of 40 to 110 as per EN 1426 standard, and petrocoke with a particle size preferably less than 300 micrometers, and extract which has a density of 8-17 API and a viscosity of 35-300 SSU and which is a by-product of a base oil unit generated from production of spindle base oil, light neutral base oil, bright stock base oil or heavy neutral base oil, as additives. The bitumen composition of the invention comprises at least 55% by weight of bitumen, 1-40% by weight of petrocoke and 2-5% by weight of extract. The present invention includes determination of the amount of the additives petrocoke and extract to be added to the bitumen, optimum values of such parameters as mixing temperature and mixing rate required for them to distribute in the bitumen homogenously and the conditions at which the modified bitumen may be stored and/or transported without losing its improved properties. Since petrocoke and extract is used in the modified bitumen composition of the present invention, as additives, the resistance of the modified bitumen composition as well as that of the asphalt coating composition obtained by mixing said modified bitumen composition with an aggregate mixture of basalt, limestone and calcite, is rendered high.

OBJECT OF THE INVENTION

An object of the present invention is to produce a high-quality modified bitumen composition using, as additives, petrocoke, a by-product of a refinery process, and extract, a base oil unit by-product, and to create a systematic and measurable increase in superpave performance grading of bitumen.

Another object of the invention is to increase the resistance of asphalt in which modified bitumen composition is used as a binding raw material and to decrease such problems in asphalt-coated roads as thermal cracks, cracks resulting from fatigue and rutting.

Another object of the invention is to provide a method of producing a modified bitumen composition that minimizes harmful effects of the substances to the environment, by processing the additives contained therein in a stable manner and not subjecting same to combustion process.

A further object of the invention is to obtain a modified bitumen composition with reduced cost, thanks to fact that the additives contained therein has a lower unit cost than other additives in the prior art and pure bitumen, with a higher quality/performance/strength as compared to pure bitumen and asphalt, and with an increased production volume.

Still another object of the invention is to increase practicability of scale-up additive/mixture works since particle size of petrocoke used as an additive is higher than that of the fly ash.

DESCRIPTION OF THE INVENTION

In petroleum refineries, in addition to different fuels obtained by treatment of crude oil, bitumen unusable as a fuel is also obtained. Bitumen is used on asphalt roads or in construction sector as an insulation material. In asphalt-coated roads where bitumen is included in the composition as a binding raw material, such problems are experienced as thermal cracks, cracks resulting from fatigue and rutting. Therefore, with the present invention, there is provided a resistant modified bitumen composition that especially reduces said problems.

The composition of the modified bitumen according to the present invention contains additive-free coating grade bitumen of at least 55% by weight and with a penetration in the range of 40 to 110 as per EN 1426 standard. Furthermore, the bitumen composition of the invention comprises petrocoke (preferably a delayed coker unit by-product), as an additive, in the range of 1%-40% by weight, preferably 5%-30% by weight and with a particle size less than 300 micrometers, preferably in the range of 25-150 micrometers. After the additive petrocoke is ground into the desired grain size range, it is directly mixed to the bitumen without being subjected to any further processing (i.e. without being combusted). Thus, contrary to those applications wherein fly ash is added to bitumen, production of the inventive modified bitumen is safer and more environment-friendly. In addition, with the additive added to bitumen in the modified bitumen composition of the present invention, the resistance of the bitumen is increased. In this manner, thermal cracks, cracks resulting from fatigue and rutting problems are prevented in asphalt-coated roads produced by mixing the modified bitumen composition with an aggregate mixture of basalt, limestone and calcite. Said modified bitumen composition comprises extract which has a density of 8-17 API and a viscosity of 35-300 SSU and which is a by-product of a base oil unit generated from production of spindle base oil, light neutral base oil, bright stock base oil or heavy neutral base oil, as an additive. In detail, said extract is obtained as a by-product in conversion of spindle, light, bright or heavy distillate obtained from atmospheric bottom product in a vacuum distillation unit, into a spindle, light, bright or heavy raffinate in a furfural extraction unit. Then spindle, light, bright or heavy raffinate is converted into spindle base oil, light neutral base oil, bright stock base oil or heavy neutral base oil in a dewaxing unit. Said extract is preferably present in the composition in the amount of 2% to 5% by weight.

In the invention, the additive petrocoke comprises at least 80% carbon by weight, 0.5%-6% hydrogen by weight, at most 8% sulphure by weight and 0.5%-4% nitrogen by weight. It is observed in the tests that such grade petrocoke further increases the resistance of the bitumen.

A method of producing the modified bitumen composition of the invention includes the following steps;
- heating bitumen at 130° C. to 140° C. for 2.5 to 3.5 hours in order to fluidize it and supplying it into a main tank at 160° C. to 170° C.,
- adding extract and petrocoke, respectively, into bitumen, as additives, in order to obtain a fluid phase and an homogenous mixture,
- allowing the mixture to stand for at least 2-4 minutes every time an additive in the amount of 1% by weight is added thereto, in order to prevent said additives to agglomerate,
- stirring at 250±25 rpm by only a overhead stirrer until the desired amount of additive is added,
- obtaining the modified bitumen composition by stirring the mixture for 1.5 to 2.5 hours after the additives are added, with the overhead stirrer is set at 250±25 rpm and homogenizer is set at 2800±25 rpm.

In the invention, bitumen is preferably heated at 135° C. for 3 hours and supplied into a main tank preferably at 165° C. Furthermore, the overhead stirrer is preferably operated at 250 rpm and the homogenizer is operated at 2800 rpm, and the last stirring process is continued for 2 hours. Said homogenizer receives sample from the bottom of the tank and supplies it back to the top region, so that a homogenous mixture is obtained at those regions close to the inner walls of the tank.

Below are summarized examples of the modified bitumen composition of the invention with different contents, and asphalt design works performed using the modified bitumen compositions provided in these examples.

EXAMPLE 1

In an illustrative embodiment of the invention, modified bitumen composition comprises 20 wt. % petrocoke, 2.5 wt. % extract and 77.5 wt. % bitumen with a penetration of 50 to 70 in accordance with EN 1426 standard. The results of the said modified bitumen composition obtained in accordance with EN 12591 (Coating Grade Bitumen) and AASHTO MP 1 (SUPERPAVE) standards are presented in Table 1. As presented in Table 1, with the method in Example 1, modified bitumen of PG 64-22 performance grade may be obtained.

TABLE 1

EN 12591 and SUPERPAVE results of the modified bitumen composition

| | Test | Standard No. | Unit | Modified Bitumen |
|---|---|---|---|---|
| EN 12591 | Penetration | TS EN 1426 | 0.1 mm | 62 |
| | Softening Point | TS EN 1427 | ° C. | 48.8 |
| | Rolling Thin Film Oven Test (RT-FOT) | TS EN 12607-1 | — | — |
| | Mass Change | — | % | 0.3 |
| | Permanent Penetration | TS EN 1426 | % | 58 |
| | Softening Point after RT-FOT | TS EN 1427 | ° C. | 54.2 |
| | Softening Point Elevation | — | ° C. | 5.4 |
| | Flash Point | TS EN ISO 2592 | ° C. | 294 |

TABLE 1-continued

EN 12591 and SUPERPAVE results of the modified bitumen composition

| | Test | Standard No. | Unit | Modified Bitumen |
|---|---|---|---|---|
| SUPERPAVE | Dynamic Shear Rheometer (DSR) | TS EN 14770 | ° C. | 67.3 |
| | DSR after RT-FOT | TS EN 14770 | ° C. | 66.6 |
| | Pressurized Aging Vessel (PAV) | TS EN 14769 | — | — |
| | DSR after PAV | TS EN 14770 | ° C. | 25.8 |
| | Bending Beam Rheometer Test (BBR) | TS EN 14771 | ° C. | −12 |
| | | | | PG 64-22 |

EXAMPLE 2

In another illustrative embodiment of the invention, modified bitumen composition comprises 20 wt. % petrocoke and 80 wt. % bitumen with a penetration of 70 to 100 in accordance with EN 1426 standard. The results of the said modified bitumen composition obtained in accordance with EN 12591 standard (Coating Grade Bitumen) are shown in Table 2.

TABLE 2

EN 12591 results of the modified bitumen composition

| | Test | Standard No. | Unit | Modified Bitumen |
|---|---|---|---|---|
| EN 12591 | Penetration | TS EN 1426 | 0.1 mm | 60 |
| | Softening Point | TS EN 1427 | ° C. | 47.6 |
| | Rolling Thin Film Oven Test (RT-FOT) | TS EN 12607-1 | — | |
| | Mass Change | — | % | 0.08 |
| | Permanent Penetration | TS EN 1426 | % | 71.7 |
| | Softening Point after RT-FOT | TS EN 1427 | ° C. | 51 |
| | Softening Point Elevation | — | ° C. | 3.4 |
| | Flash Point | TS EN ISO 2592 | ° C. | 346 |

EXAMPLE 3

In another illustrative embodiment of the invention, modified bitumen composition comprises 30 wt. % petrocoke and 70 wt. % bitumen with a penetration of 50 to 70 in accordance with EN 1426 standard. Table 3 shows test comparisons of the said modified bitumen composition and additive-free bitumen composition performed according to the SUPERPAVE standard.

TABLE 3

SUPERPAVE results of the modified bitumen composition

| | Test | Standard No. | Unit | Additive-free bitumen | Modified Bitumen |
|---|---|---|---|---|---|
| SUPERPAVE | Dynamic Shear Rheometer (DSR) | TS EN 14770 | ° C. | 64.0 | 81.6 |
| | DSR after RT-FOT | TS EN 14770 | ° C. | 64.5 | 85.3 |
| | Pressurized Aging Vessel (PAV) | TS EN 14769 | — | — | — |
| | DSR after PAV | TS EN 14770 | ° C. | 26.1 | 29.4 |
| | Bending Beam Rheometer Test (BBR) | TS EN 14771 | ° C. | −12 | −12 |
| | | | | PG 64-22 | PG 82-22 |

According to the results in Table 3, it is apparent that the dynamic shear rheometer value (high temperature performance value) of the modified bitumen obtained in the relevant example approximates to 82 which is the maximum value of the Superpave standard. In other words, the high temperature performance of the modified bitumen of the present invention is quite high.

EXAMPLE 4

In another illustrative embodiment of the invention, modified bitumen composition comprises 30 wt. % petrocoke and 70 wt. % bitumen with a penetration of 70 to 100 in accordance with EN 1426 standard. Table 4 shows test comparisons of the said modified bitumen composition and additive-free bitumen performed according to the SUPER- PAVE standard. Accordingly, with the method in Example 4, high-quality modified bitumen of PG 76-16 performance grade may be obtained.

TABLE 4

SUPERPAVE results of the modified bitumen composition

| | Test | Standard No. | Unit | Additive-free bitumen | Modified Bitumen |
|---|---|---|---|---|---|
| SUPERPAVE | Dynamic Shear Rheometer (DSR) | TS EN 14770 | ° C. | 64.0 | 75.5 |
| | DSR after RT-FOT | TS EN 14770 | ° C. | 64.5 | 80.2 |
| | Pressurized Aging Vessel (PAV) | TS EN 14769 | — | — | — |
| | DSR after PAV | TS EN 14770 | ° C. | 26.1 | 28.2 |
| | Bending Beam Rheometer Test (BBR) | TS EN 14771 | ° C. | −12 | −6 |
| | | | | PG 64-22 | PG 76-16 |

In a preferred embodiment of the present invention, the modified bitumen composition in Example 1 is mixed with an aggregate mixture of basalt, limestone and calcite, the features of which are given in Tables 5 and 6, for use in asphalt-coated roads.

TABLE 5

Features of the Aggregate used in Asphalt Design Works

| Test | Test Method | Unit | Specification Limits (Highway Technical Specification 2013) | Features of aggregate used in the design |
|---|---|---|---|---|
| Resistance to Fragmentation (Los Angeles Abrasion Loss) 500 rpm | TS EN 1097-2* | % | Max. 25 | 11.9 |
| Resistance to Air Effects (Loss with MgSO4) | TS EN 1367-2* | % | Max. 14 | 2.8 |
| Flatness Index (for 5-12 mm aggregate) | TS EN 933-3* | % | Max. 20 | 20 |
| Flatness Index (for 12-19 mm aggregate) | TS EN 933-3* | % | Max. 20 | 12 |
| Grain Density of Rough Aggregates (Volume Specific Gravity - dry) | TS-EN 1097-6* | gr/cm$^3$ | — | 2,865 |
| Absorption of Rough Aggregates | TS EN 1097-6* | % | Max. 2.0 | 1.02 |
| Grain Density of Fine Aggregates (Volume specific gravity - dry-average) | TS EN 1097-6* | gr/cm$^3$ | — | 2,624 |
| Absorption of Fine Aggregates - average | TS EN 1097-6* | % | Max. 2.0 | 1.5 |
| Methylene Blue (to 0/2 mm of fine aggregate) | TS EN 933-9* | g/kg | Max.1.5 | 1.25 |
| Plasticity Index | TS 1900-1 | % | NP | NP |
| Filler Grain Density Assay | TS EN 1097-7* | gr/cm$^3$ | — | 2,753 |

TABLE 6

Aggregate usage ratio and gradation of mixture

| Sieve Aperture (Inch) | Sieve Aperture (mm) | Usage Ratio 10% 12-19 mm basalt | Usage Ratio 47% 5-12 mm basalt | Usage Ratio 43% 0-5 mm limestone | Gradation of Mixture | Highway Technical Specification 2013 Abrasion Type1 Layer Limits Specification Min | Specification Max | Mixture Formula Min | Mixture Formula Max |
|---|---|---|---|---|---|---|---|---|---|
| 3/4" | 19.0 | 100.0 | | | 100.0 | 100 | | 100 | |
| 1/2" | 12.5 | 19.4 | 98.9 | | 91.4 | 88 | 100 | 88 | 95 |
| 3/8" | 9.5 | 1.1 | 77.6 | 100.0 | 79.6 | 72 | 90 | 76 | 84 |
| No 4 | 4.75 | 0.8 | 15.1 | 96.8 | 48.8 | 42 | 52 | 45 | 52 |
| No 10 | 2.00 | 0.8 | 2.0 | 59.9 | 26.8 | 25 | 35 | 25 | 30 |
| No 40 | 0.425 | 0.7 | 1.6 | 27.0 | 12.4 | 10 | 20 | 10 | 15 |
| No 80 | 0.180 | 0.6 | 1.2 | 19.6 | 9.1 | 7 | 14 | 7 | 12 |
| No 200 | 0.075 | 0.6 | 1.0 | 12.0 | 5.7 | 3 | 8 | 4 | 8 |

Table 7 shows data from design works of asphalt coatings comprising additive-free bitumen and the modified bitumen prepared with the composition in Example 1, and the results of durability/characterization works performed in accordance with Highway Technical Specification 2013.

TABLE 7

Design and Durability Results of Asphalt Coatings Comprising Additive-free Bitumen and the Modified Bitumen Prepared with Example 1

| Test | Test Method | Abrasion Type Specification Limits (Highway Technical Specification 2013) Min | Abrasion Type Specification Limits (Highway Technical Specification 2013) Max | Asphalt comprising additive-free bitumen | Modified Bitumen Prepared with Example 1 |
|---|---|---|---|---|---|
| Marshall Stability, kg | TS EN 12697-34 | 900 | — | 1110 | 1140 |
| Void, % | TS EN 12697-8 | 3 | 5 | 4.0 | 4.0 |
| Void Filled with Asphalt, % | TS EN 12697-8 | 65 | 75 | 70.0 | 71.50 |
| Voids in the Mineral Aggregate, (VMA) % | TS EN 12697-8 | 14 | 16 | 14.0 | 14.10 |
| Flow, mm ($10^{-2}$ in) | TS EN 12697-34 | 2 (8) | 4 (16) | 3.20 | 3.10 |
| Filler/Bitumen Ratio | — | — | 1.5 | 1.2 | 1.1 |
| Bitumen (to 100, by weight) | TS EN 12697-1 | 4 | 7 | 4.80 ± 0.2 | 5.20 ± 0.2 |
| Rutting (at 30000 rpm and 60° C.), max. % | TS EN 12697-22 | — | 8 | 7.1 | 6.2 |
| Peeling Strength Surface coated with bitumen % (after keeping in water at 60° C. for 24 hours) | TS EN 12697-11 | 60 | — | 60-65 | 70-75 |

In another preferred embodiment of the present invention, modified bitumen composition prepared according to Example 2 is mixed with an aggregate mixture of basalt, limestone and calcite, the features of which are given in Tables 5 and 6, for use in asphalt-coated roads. Table 8 shows data and durability results from asphalt design works.

TABLE 8

Design and Durability Results of Asphalt Coatings Comprising Additive-free
Bitumen and the Modified Bitumen Prepared with Example 2

| Test | Test Method | Abrasion Type Specification Limits (Highway Technical Specification 2013) Min | Abrasion Type Specification Limits (Highway Technical Specification 2013) Max | Asphalt comprising additive-free bitumen | Modified Bitumen Prepared with Example 2 |
|---|---|---|---|---|---|
| Marshall Stability, kg | TS EN 12697-34 | 900 | — | 1110 | 1045 |
| Void, % | TS EN 12697-8 | 3 | 5 | 4.0 | 4.0 |
| Void Filled with Asphalt, % | TS EN 12697-8 | 65 | 75 | 70.0 | 71.0 |
| Voids in the Mineral Aggregate, (VMA) % | TS EN 12697-8 | 14 | 16 | 14.0 | 14.0 |
| Flow, mm ($10^{-2}$ in) | TS EN 12697-34 | 2 (8) | 4 (16) | 3.20 | 3.70 |
| Filler/Bitumen Ratio | — | — | 1.5 | 1.2 | 1.1 |
| Bitumen (to 100, by weight) | TS EN 12697-1 | 4 | 7 | 4.80 ± 0.2 | 5.40 ± 0.2 |
| Rutting (at 30000 rpm and 60° C.), max. % | TS EN 12697-22 | — | 8 | 7.1 | 7.0 |
| Peeling Strength Surface coated with bitumen % (after keeping in water at 60° C. for 24 hours) | TS EN 12697-11 | 60 | — | 60-65 | 70-75 |

According to the data obtained, it is determined that the modified bitumen composition exhibits better performance in asphalt properties than the additive-free bitumen, and it can be used in road laying as a commercial product. Since petrocoke and extract is used in the modified bitumen composition of the present invention, as additives, the resistance of the modified bitumen composition and that of the asphalt obtained using the modified bitumen composition is rendered high. The effect of bitumen on rutting, fatigue and thermal crack that are considered as the degradation causes of the asphalt coatings is 40%, 60% and 90%, respectively. As seen in Tables 7 and 8, an increase of 15% is achieved in the peeling strength of aggregate (EN TS EN 12697-11) that is one of the significant parameters simulating road impairments and in the results of the rutting test (EN TS EN 12697-22), as compared to the works with pure bitumen. Therefore, one of the major advantages of the invention is to provide refineries that produce both bitumen and petrocoke and extract with a new modified product and method of production. Furthermore, since petrocoke used as an additive is a petroleum refinery product, refinery's dependence on foreign sources is reduced and effective operation of the refinery is obtained.

Stability tests are conducted in order to determine whether the modified bitumen compositions of the present invention is suitable for storage and transportation, and it is observed that the modified bitumen composition in Example 1, if stored by being stirred or not stirred, maintains its homogeneity prior to its addition to asphalt (during storage in the refinery field and/or transportation to asphalt plants). After the modified bitumen composition in Example 1 is kept at 160° C. for 10 days, without being stirred, samples are taken from different points in order to conduct penetration and softening point measurements, the results of which are given in Table 9.

TABLE 9

Softening Point and Penetration Results from Storage
of Example 1 without Being Stirred

| Sample | Softening Point (° C.) | Penetration (0.1 mm) |
|---|---|---|
| Sample in day 1 (lower) | 48.8 | 66.3 |
| Sample in day 1 (upper) | 48.2 | 68.3 |
| Sample in day 10 (lower) | 48.5 | 69.3 |
| Sample in day 10 (upper) | 48.5 | 69.6 |

Another measurement for determination of the storage stability is to apply the procedure of EN 13399 standard. In this standard, samples taken from the lower and upper points of the bitumen kept at 180° C. for 3 days, without being stirred, are measured for the softening point; and if the difference between the lower and upper point is 5° C. and below, sample is considered to be stable. Table 10 represents the results of EN 13399 standard applied to inventive modified bitumen.

TABLE 10

Measurements of the softening point obtained under EN 13399

| Sample | Softening Point (° C.) |
|---|---|
| Modified bitumen composition of Example 1 (lower) | 49.4 |
| Modified bitumen composition of Example 1 (upper) | 54.4 |

The results show that since production conditions may yield modified products with homogenous distribution, it is proved that it can be used as storage parameters in long-term storage periods. If not stirred, and when kept at 160° C., no degradation in the product homogeneity is observed up to 10 days. Furthermore, it is also seen, in the analyses performed under the standard, that product is stable.

The invention claimed is:

1. A modified bitumen composition suitable to be used as a binding raw material in asphalt-coated roads and containing bitumen with a penetration in the range of 40 to 110 as per EN 1426, characterized in that the modified bitumen composition comprises at least 55% by weight bitumen, 1% to 40% by weight of petrocoke with a particle size less than 300 micrometers, and 2% to 5% by weight of an extract which has a density of 8-17 API, a viscosity of 35-300 SSU, and is a by-product generated during production of spindle base oil, light neutral base oil, bright stock base oil or heavy neutral base oil in a base oil unit.

2. The modified bitumen composition according to claim 1, further characterized in that said petrocoke is in the range of 5% to 30% by weight and has a particle size of 25-150 micrometers.

3. The modified bitumen composition according to claim 1, further characterized by comprising 20% by weight of petrocoke, 2.5% by weight of extract and 77.5% by weight of bitumen with a penetration of 50 to 70.

4. The modified bitumen composition according to claim 1, further characterized in that said petrocoke comprises at least 80% carbon by weight, 0.5%-6% hydrogen by weight, at most 8% sulphure by weight and 0.5%-4% nitrogen by weight.

5. An asphalt coating composition comprising a mixture of the modified bitumen composition according to claim 1 and an aggregate mixture of basalt, limestone and calcite.

* * * * *